United States Patent Office 3,772,401
Patented Nov. 13, 1973

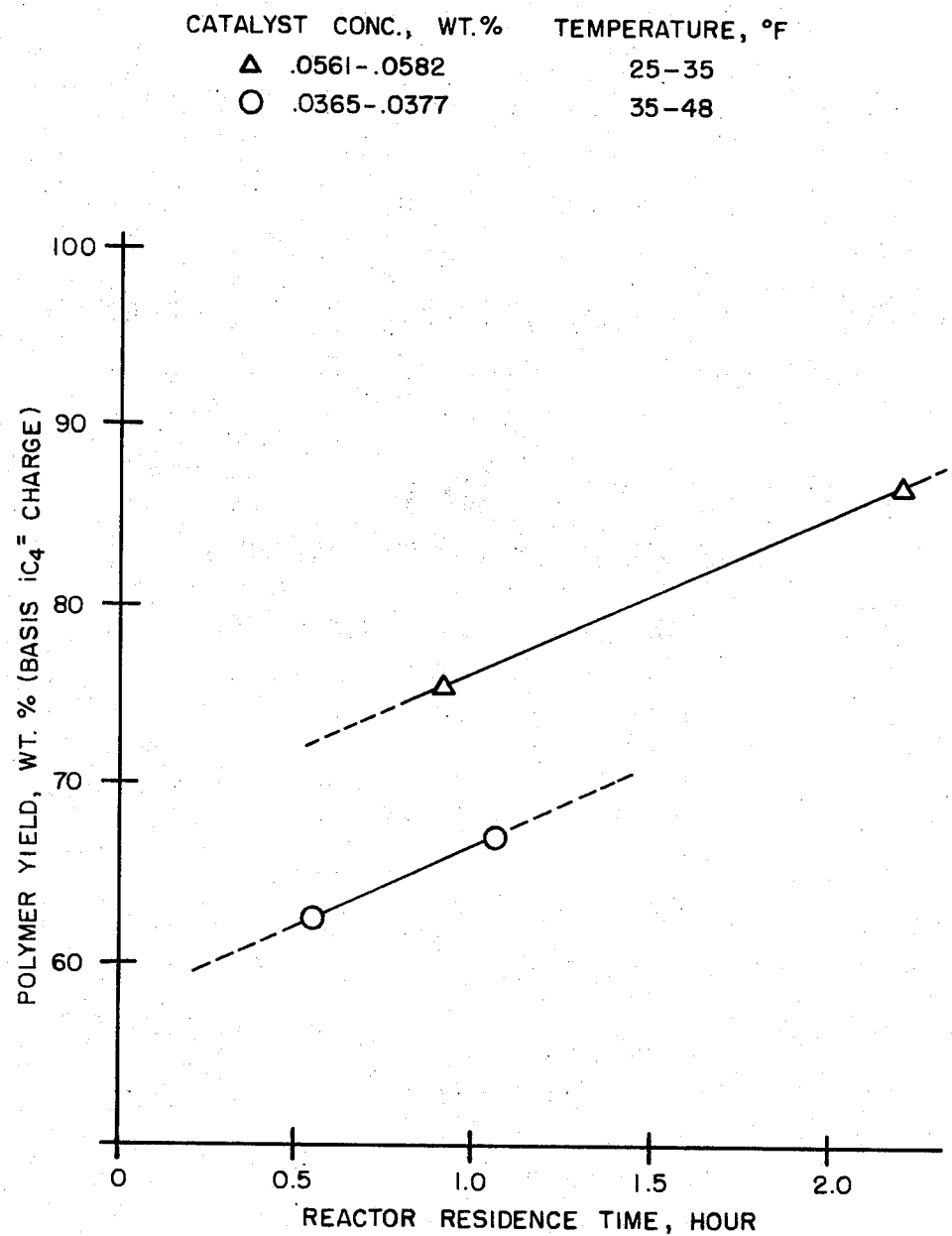

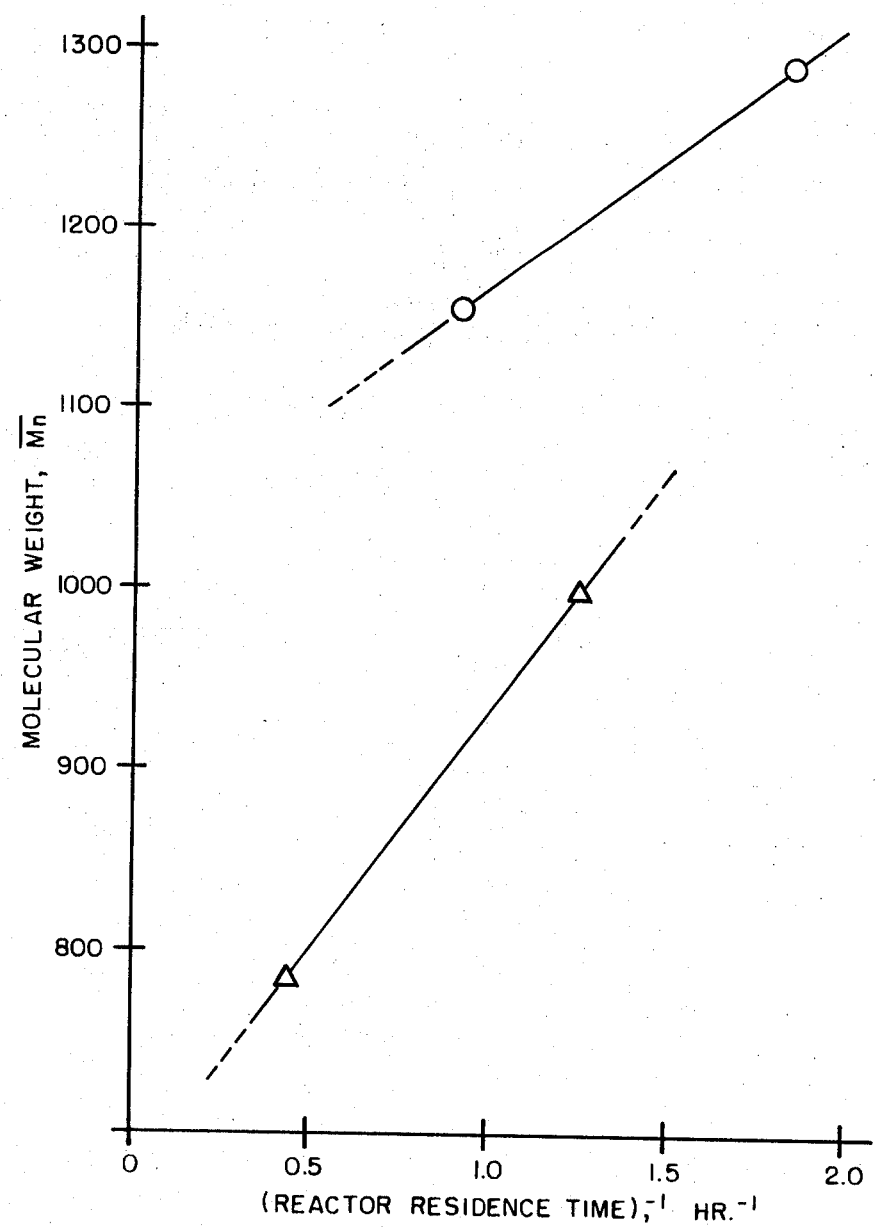

3,772,401
CONTINUOUS 2-METHYL-1-ALKENE
POLYMERIZATION PROCESS
William D. Stepanek, Fishkill, N.Y., assignor to
Texaco Inc., New York, N.Y.
Continuation-in-part of abandoned application Ser. No. 836,941, June 26, 1969. This application Oct. 27, 1971, Ser. No. 192,930
Int. Cl. C07c 3/18
U.S. Cl. 260—683.15 B                10 Claims

ABSTRACT OF THE DISCLOSURE

A lower 2-methyl-1-alkene continuous polymerization process which produces a polymer having a molecular weight within the range of from 750 to 2500 by contacting a 2-methyl-1-alkene or mixtures thereof with an aluminum bromide, hydrogen bromide catalyst at a temperature of from about 15° F. to about 75° F. under an olefin liquefying pressure at a high olefin to catalyst mole ratio for a residence time of about 1½ hours to 2½ hours and recovering a polymer of a lower 2-methyl-1-alkene.

CROSS REFERENCE TO COPENDING APPLICATION

This application is a continuation-in-part of commonly assigned copending application Ser. No. 836,941, filed June 26, 1969 and now abandoned.

This invention relates to a continuous polymerization process and more particularly to a process for polymerizing a 2-methyl-1-alkene having from four to seven carbon atoms in the presence of an aluminum bromide-hydrogen bromide catalyst utilizing a high 2-methyl-1-alkene to catalyst mole ratio.

It is known to polymerize 2-methyl-1-alkenes such as isobutylene, by passing on olefin feed solution containing the same through a fixed-bed reactor in which the effective polymerization catalyst is an aluminum chloride catalyst. The polymerization is effected at low temperature, below 0° F. in order to obtain a molecular weight greater than a dimer or a trimer of the monomer. Thus, increases in temperatures above 0° F. produce polymers of low molecular weight, and of varying molecular weight. As is apparent from above, low temperature polymerization requires extensive refrigeration equipment and special process procedures in order to prepare an olefin polymer.

A particular problem associated with the preparation of a 2-methyl-1-alkene polymer when such polymer product requires a molecular weight within a particular molecular weight is the distribution of polymer molecules having varying molecular weight. By this is meant that a high weight percent of polymer molecules having, for example, a deviation from the average molecular weight of ±100 is extremely difficult to produce in any polymerization process. A polymer having such deviation is often required for example for use as an oil additive, especially where polymer molecules having low molecular weight do not perform the required function of the additive. As is apparent from the foregoing, a low yield of polymer molecules having the required molecular weight produces a low yield of a final product such as an oil additive. A low yield, therefore, requires even greater concentrations of the finished additive in a particular formulation. Thus, a polymerization process can produce many different polymer molecules having varying molecular weights which are either too low or too high for use in preparing a particular product. Thus, for example, various oil additives such as phosphosulphurized treated polyisobutylenes and polyisobutylene which is utilized as a starting reactant to produce polyalkyenylsuccinimides by the interaction of a polyisobutylene polymer with maleic anhyride followed by reaction with an amine requires for optimum results molecular weights of a polymer within a range of about 750 to 2500, preferably from 900 to 1500. As is apparent from the requirements of the above additives, a wide deviation in molecular weight of polymer molecules can require increasing concentrations of an additive which is utilized in a given lubricating oil formulation.

It is therefore an object of this invention to selectively prepare a 2-methyl-1-alkene polymer within a particularly preferred molecular weight range and with a narrow molecular weight deviation at high 2-methyl-1-alkene to catalyst mole ratios and at temperatures above 0° F.

It has now been found that a polymer of a lower 2-methyl-1-alkene which has a molecular weight within the range of from about 750 to about 2500 can be continuously prepared by a polymerization process which comprises introducing a 2-methyl-1-alkene monomer feed selected from a 2-methyl-1-alkene having from 4 to 7 carbon atoms and mixtures thereof and a catalytic amount of an aluminum bromide, hydrogen bromide catalyst into a reaction zone at a polymerization temperature of from 15° F. to about 75° F. and under a 2-methyl-1-alkene liquifying pressure at a mole ratio of 2-methyl-1-alkene feed to aluminum bromide of at least 150 to 1, recovering a polymer effluent from said reaction zone as the 2-methyl-1-alkene monomer feed and catalyst are introduced into said reaction zone and recovering a polymer of a 2-methyl-1-alkene having a molecular weight of from about 750 to about 2500 from said polymer effluent. It has been found that when a mole ratio of at least about 150 to 1 of 2-methyl-1-alkene monomer feed to catalyst (basis total 2-methyl-1-alkene monomer present in feed) is utilized under a liquifying presusre and at temperatures of from about 15° F. to about 75° F., a polymer of the 2-methyl-1-alkene monomer feed (herein after referred to as an alkene polymer) is obtained which has a molecular weight within the range of from about 750 to about 2500, preferably from about 900 to about 1500, at a yield of at least about 40 wt. percent, generally at least about 60 wt. percent (basis alkene feed). In addition a total polymer product comprising a mixture of individual polymers of varying molecular weights is produced after equilibrium is achieved which has in general at least about 75 wt. percent of the polymer molecules within the above molecular weight range, often 90 wt. percent or higher and in general a ratio of the weight average to number average molecular weight of from about 1.1 to 1.9 often from about 1.2 to 1.8. The above ratio measures the deviation from an ideal polymer, wherein all polymer molecules have the same molecular weight, that is a ratio of 1. The higher the ratio, the greater the deviation.

In accordance with this method, the 2-methyl-1-alkene feed under liquifying pressure and preferably at a temperature of from about 20° F. to about 75° F. and the aluminum bromide-hydrogen bromide catalyst solution are introduced into a conventional pressure reactor, an effluent stream containing the polymerization reaction products is recovered from said reactor, and the alkene polymer recovered from the effluent. The introduction of the 2-methyl-1-alkene feed and the aluminum bromide-hydrogen bromide catalyst solution can be simultaneous, in indifferent order or intermittent. In general, it is preferred to have the 2-methyl-1-alkene feed and catalyst feed introduced continuously into the reactor in order to produce a ratio of moles of 1-alkene feed to moles of aluminum bromide of at least 150 to 1 more preferably from about 1000 to about 1500 to 1. The effluent polymer product is continuously removed by conventional means such as through a pressure reduction valve in combination with a level sensing device can be quenched in a medium such as aqueous caustic or a water-alcohol mixture. The polymer product can be recovered by conventional means such as by diluting with hexane, washing with water, and vacuum stripping.

The 2-methyl-1-alkene feed (which term is used to include one or more monomers) can be: isobutylene, 2-methyl-1-butene, 2-methyl-1-pentene, and 2-methyl-1-hexene, preferably isobutylene. In general it is preferred to use with the 2-methyl-1-alkene or mixtures thereof an inert diluent or solvent. The solvent is generally a hydrocarbon or mixture of hydrocarbons, such as a saturated aliphatic hydrocarbon having from three to eight carbon atoms, preferably from three to six carbon atoms, such as isobutane, n-butane and isopentane which solvent is substantially inert under polymerization conditions. The nature of the diluent is not critical so long as it is substantially inert and effective as a solvent. It is preferred in carrying out the process of this invention to minimize the amount of water or sulfur compounds such as hydrogen sulfide which are present in the alkene feed or diluent. Thus, it is preferred to have the alkene feed substantially free of both water and sulfur containing compounds. In addition, it is preferred in carrying out the process of this invention to polymerize a 2-methyl-1-alkene monomer with less than 1.0 wt. percent, preferably 0.5 wt. percent of different 2-methyl-1-alkene monomers. This is preferred since a homopolymer is produced in high yields with the preferred molecular weight distribution, which homopolymer has particular utility for use as a starting material for the preparation of various oil additives. In addition to the use of a diluent such as set forth above, it is contemplated within the scope of this invention that various alkenes such as ethylene, propylene, 1-butene, 1-octene, and 2-alkenes can be present in the alkene olefin feed. These other olefins should not be present in an amount which adversely affect the preparation of the alkene polymer having a molecular weight between 750 and 2500. In general the total of alkenes present other than 2-methyl-1-alkenes should be less than about 60 wt. percent in order to obtain greater catalyst utilization. Generally the combined diluent, alkene feed comprises from about 5 to about 80 parts by weight of the 2-methyl-1-alkene preferably from about 10 to 40 parts by weight 2-methyl-1-alkene, and from 20 to 95 parts by weight diluent. Both purified and refinery feed streams can be employed in the process. Suitable feed streams are those containing from 5 to 50 parts by weight of 2-methyl-1-alkene preferably from 9 to 30 parts by weight and from 50 to 95 parts by weight diluent preferably from 70 to 91 parts by weight. In addition, it is preferred to have less than 60 parts by weight olefins such as ethylene, propylene and butenes preferably less than 40 parts by weight in the alkene feed. It is also preferred to have less than 1 part by weight of 2-methyl-1-alkene olefins other than the desired 2-methyl-1-alkene to be polymerized, preferably less than 0.5 part by weight in the alkene feed.

The catalyst utilized for the polymerization is aluminum bromide promoted with hydrogen bromide. The aluminum bromide hydrogen bromide catalyst solution utilized is in general prepared in the presence of a medium substantially inert to the catalyst, reactants and polymerization products such as a saturated aliphatic hydrocarbon having from three to six carbon atoms, and saturated cycloaliphatic hydrocarbons having from three to six carbon atoms, such as propane, butane, isobutane, hexane, and cyclohexane. It is preferred to have the aluminum bromide solvent free of water, sulfur and unsaturated organic compounds. The hydrogen bromide can be used separately with or without solvent but it has been found most convenient to employ a single solution of aluminum bromide and hydrogen bromide. It is also convenient to employ the same solvent for both the catalyst solution and for the alkene feed solution. Highly effective catalyst solutions comprise from about 3 to 25 weight percent of aluminum bromide and from about 1 to 10 weight percent hydrogen bromide in an inert diluent. The mixing time and temperature employed in the preparation of the catalyst mixture can vary over a wide range and in general is from about 1 minute to about 5 hours at from about 70° F. or lower, to about 125° F. In general, the mole ratio of the hydrogen bromide to aluminum bromide can vary over a wide range and in general is from about 0.5:1 to about 2:1, preferably from about 0.75:1 to about 1.25:1. As stated above it is preferred to prepare a catalyst solution, for use in the process of this invention, although the aluminum bromide and hydrogen bromide can be introduced individually into the reactor.

In carrying out the process of this invention liquifying pressures are utilized, that is, pressures sufficient to maintain the presence of a 2-methyl-1-alkene in the liquid state within the liquid phase of the reactor. In general, pressure up to about 5000 p.s.i.g. or higher, more preferably pressures of from about 50 to about 200 p.s.i.g. can be utilized. The amount of time which it takes to arrive at a predetermined volume of feed within a reaction zone is defined as the residence time. The rate of polymerization of isobutylene with most Friedel-Craft catalysts is known to be very fast from, inter alia, Textbook of Polymer Chemistry, Interscience Publishers, Inc., N.Y. 1957. Hence it was unexpected that residence time would have a significant effect on the polymer yield and the polymer weight. In the development of the present process, it was found that the residence time has a critical influence on both polymer yield and molecular weight. Indeed, the reactor residence time can be used to control the polymer yield and the molecular weight of the polymer produced.

The above findings are illustrated graphically in the curves of FIGS. 1 and 2, the former showing the relationship between polymer yield and residence time and the latter showing the relationship between the molecular weight and the residence time. In carrying out the process of this invention, the residence time is about ½ hour to about 2½ hours, more preferably from about 1 to about 2 hours. In addition, a liquid hourly space velocity (a volume of alkene feed to volume of contactor void per hour) of from about 0.2 to about 3, more preferably from about 0.4 to about 2 can be utilized in the process of this invention.

In the following examples, Examples 1 through 3, a 6.3 liter pressure stirred tank equipped with cooling means, catalyst and 2-methyl-1-alkene containing feed inlet means and effluent exit means was utilized. The 2-methyl-1-alkene feed and catalyst solution were metered into the reactor and stirred under pressure and the effluent was removed through a pressure reduction valve into a product receiver containing water and sodium hydroxide as a quench medium. The catalyst solution was prepared by dissolving aluminum bromide (5 weight percent) and hydrogen bromide in cyclohexane at an $AlBr_3$ to HBr mole ratio of 1 to 1. In each example, the run consisted of a preliminary 6 to 10 hour period which represented at least 6 reactor residence times prior to collecting alkene polymer at a pressure of 50 p.s.i.g. After this period the polymer was continuously collected for a period of 144 hours and the molecular weight, the yield of polymer based upon the charge stock and catalyst, the molecular weight distribution, and the viscosity of the polymer were determined. The viscosity of the polymer was determined by the standard ASTM kinematic viscosity measurement in centistokes at 210° F. (ASTM D-445). The number average molecular weight of the polymer was determined by vapor phase osmometry (D-2503) using benzene as the solvent and benzyl as the standard. The molecular weight distribution weight average molecular weight of the polymer was determined by gel permeation chromatography using a silica gel column and tetrahydrofuran as a solvent. The results of the process of this invention are illustrated in Examples 1 to 3 which are set forth in Table I.

Table I below sets forth the reactor conditions found best suited for the production of 1250 $\overline{M}n$ nominal polybutylene are: 48° F., 0.55 hour residence time, and isobutylene to AlBr$_3$ weight ratio of 250 with 11 nominal weight percent isobutylene in the reaction feed. In the practice of the process of the invention, the molecular weight and yield of the polybutylene can be controlled by reactor temperature, residence time, and catalyst concentration.

The results set forth in Table I demonstrate that a polymer of a 2-methyl-1-alkene can be prepared having a molecular weight within the range of from 750 to 2500 at high 2-methyl-1-alkene to aluminum bromide mole ratios wherein the polymer prepared has a viscosity representative of a polymer within that molecular weight range with a ratio of weight average to number averge molecular weight of 1.6 to 1.8. More particularly, Examples 1 and 2 demonstrate that a polymer of isobutylene having a molecular weight of 1260 which has a viscosity in centistokes at 210° F. of 632 and 664 respectively is prepared when polymerized at a temperature of 48° F. whereas a polymer produced at 0° F. having the same average molecular weight, has a viscosity of 2000 centistokes at 210° F. and a ratio of weight average to number average molecular weight of 2.14. Thus, the process of this invention is particularly adaptable for preparing polymers of a 2-methyl-1-alkene monomer within a preferred molecular weight range and a narrow distribution of molecular weights of polymer molecules within such range.

TABLE I

| Example number | 1 | 2 | 3 |
|---|---|---|---|
| Alkene feed, wt. percent: | | | |
| Isobutylene | 11.2 | 11.0 | 11.2 |
| Isobutane | 38.0 | 29.4 | 38.0 |
| Butene-1 | 9.3 | 7.4 | 9.3 |
| Butene-2 | 24.0 | 15.3 | 24.0 |
| n-Butane | 14.6 | 33.3 | 14.6 |
| Propane, propylene, pentane | 2.9 | 3.6 | 2.9 |
| Grans feed/hour | 6,400 | 6,400 | 3,200 |
| Grams catalyst solution/hour | 56 | 48 | 25 |
| Mole ratio, isobutylene/AlBr$_3$ | 1,190 | 1,430 | 1,380 |
| Temperature, °F | 48 | 48 | 0 |
| Residence time, hours | 0.55 | 0.55 | 1.0 |
| Heavy polymer yield, wt. percent basis isobutylene | 62.6 | 64.1 | 70.0 |
| Average $\overline{M}w$ of polymer, $\overline{M}n$ | 1,260 | 1,260 | 1,260 |
| Viscosity, cs. at 210° F | 632 | 664 | 2,000 |
| Molecular weight distribution, $\overline{M}w/\overline{M}n$ | 1.7 | 1.8 | 2.14 |

What is claimed is:

1. A process for making a 2-methyl-1-alkene polymer having a molecular weight of from about 750 to about 2500 which comprises introducing a 2-methyl-1-alkene monomer feed selected from a 2-methyl-1-alkene having from 4 to 7 carbon atoms and mixtures thereof and a catalytic amount of an aluminum bromide hydrogen bromide catalyst stirring said feed and catalyst in a reaction zone for a residence time of about ½ hour to 2½ hours at a temperature of from 15° F. to 75° F. and under a 2-methyl-1-alkene liquefying pressure and a mole ratio of 2-methyl-1-alkene feed to aluminum bromide of from 1000 to 1500 to 1, at a liquid hour space velocity of about 0.2 to about 3, recovering a polymer effluent from said reaction zone as the 2-methyl-1-alkene monomer feed and catalyst are introduced into said reaction zone and recovering said polymer from said polymer effluent.

2. A process of claim 1 wherein the polymerization temperature is from 20° F. to 75° F.

3. A process of claim 1 wherein the 2-methyl-1-alkene is isobutylene.

4. A process of claim 3 wherein the 2-methyl-1-alkene feed comprises from 9 to 30 parts by weight isobutylene and from 70 to 91 parts by weight of a hydrocarbon diluent.

5. A process of claim 4 wherein the hydrogen bromide to aluminum bromide mole ratio is from about 0.5 to 1 to about 2 to 1 and the alkene polymer has a weight average to number average molecular weight in the range of from about 1.2 to 1.8.

6. A process of claim 1 wherein the molecular weight of the polymer is from about 900 to about 1500.

7. A process of claim 1 wherein the hydrogen bromide to aluminum bromide mole ratio is from about 0.5 to 1 to about 2 to 1 and the polymer has a weight average to number average molecular weight in the range of from about 1.2 to 1.8.

8. The process of claim 1 wherein the residence time is from about 1 to about 2 hours.

9. The process of claim 1 wherein the liquid hourly space velocity ranges from about 0.4 to about 2.

10. The process of claim 1 wherein the monomer is isobutylene, the average molecular weight of the polymer produced is 1260, its viscosity ranges from 632 to 664, the temperature is about 48° F., the residence time is about 0.55 hours and the mole ratio of isobutylene to catalyst ranges from 1190 to 1430.

References Cited

UNITED STATES PATENTS 2,490,578  12/1949  Carmody _____ 260—683.15
3,497,568  2/1970  Stepanek et al. ____ 260—683.15

OTHER REFERENCES

Fontana et al.: Ind. & Engr. Chem., vol. 44 (1942), pp. 1688–1694.

PAUL M. COUGHLAN, Jr., Primary Examiner

U.S. Cl. X.R.

252—51.5 A